United States Patent [19]
Groshens et al.

[11] Patent Number: 5,543,214
[45] Date of Patent: Aug. 6, 1996

[54] THERMO-ADHESIVE CROSS-LINKABLE TEXTILE PRODUCT

[75] Inventors: Pierre Groshens, Peronne; Christian Paire, Roisel, both of France

[73] Assignee: Laniere de Picarde, Peronne, France

[21] Appl. No.: 139,799

[22] Filed: Oct. 22, 1993

Related U.S. Application Data

[63] Continuation-in-part of Ser. No. 883,293, May 14, 1992, abandoned, which is a continuation-in-part of Ser. No. 731,366, Jul. 16, 1991, abandoned, which is a continuation of Ser. No. 513,047, Apr. 23, 1990, abandoned, which is a continuation of Ser. No. 294,229, Jan. 6, 1989, abandoned.

[30] Foreign Application Priority Data

Jan. 8, 1988 [FR] France ................................. 88 00144

[51] Int. Cl.$^6$ ........................................................ C09J 7/02
[52] U.S. Cl. ........................... 428/261; 428/349; 428/355
[58] Field of Search ........................................ 428/347, 349, 428/355, 261

[56] References Cited

U.S. PATENT DOCUMENTS

| | | | |
|---|---|---|---|
| 3,937,859 | 2/1976 | Carra | 428/194 |
| 3,992,418 | 11/1976 | Lauchenauer | 428/196 |
| 4,438,533 | 3/1984 | Hefele | 2/97 |
| 4,906,492 | 3/1990 | Groshens | 427/148 |
| 4,990,392 | 2/1991 | Groshens | 428/196 |
| 5,153,064 | 10/1992 | Hetele | 428/355 |

*Primary Examiner*—Jenna L. Davis
*Attorney, Agent, or Firm*—Popham, Haik, Schnobrich & Kaufman, Ltd.

[57] ABSTRACT

A thermo-adhesive product is formed from a backing fabric with a thermo-adhesive layer deposited on its surface. In a preferred embodiment, the thermo-adhesive layer is deposited in a discontinuous fashion as dots. The thermo-adhesive layer is formed of polymers which are non-tacky at ambient temperatures but which become tacky and plastic at a first elevated temperature range which is beneath the critical temperature for the polymeric composition, and which become thermo-setting at a second elevated temperature range which is above the critical temperature. In alternate preferred embodiments, the thermo-adhesive compositions can be cross-linked under the influence of radiation from an electron beam or UV radiation.

6 Claims, No Drawings

THERMO-ADHESIVE CROSS-LINKABLE TEXTILE PRODUCT

This patent application is a continuation-in-part of U.S. patent application Ser. No. 07/883,293, filed May 14, 1992, now abandoned, which is a continuation-in-part of U.S. patent application Ser. No. 07/731,336, filed Jul. 16, 1991, now which is a continuation of U.S. patent application Ser. No. 07/513,047, filed Apr. 23, 1990, abandoned, which is a continuation of U.S. application Ser. No. 07/294,229, filed Jan. 6, 1989, abandoned.

FIELD OF THE INVENTION

The present invention is directed to thermo-adhesive materials useful in the textile industry, and more particularly is directed to a textile product in which a backing fabric is covered with a thermo-adhesive polymeric resin that is thermo-plastic at a first elevated temperature range and thermo-setting at a second higher elevated temperature range.

BACKGROUND OF THE INVENTION

In garment production, reinforcing materials are often glued to the back of a fabric to improve its strength or increase its thickness. The reinforcing materials or "fusible interlining fabrics" are coated with an adhesive, and are adhered to another piece of fabric by use of heat and/or pressure.

Fusible interlining fabrics are generally formed of a backing fabric covered with a thermo-adhesive product. The properties of the reinforcing cloth will vary depending on the desired use, and can be woven, knitted, or non-woven fabrics made of natural, synthetic, or metallic materials.

The thermo-adhesive resin is frequently applied to the backing fabric or cloth in a discontinuous pattern, such as a dot pattern applied with an engraving cylinder. The thermo-adhesive, usually in the form of a polymeric powder or paste, is raised to a temperature of about 80° C., at which point it becomes tacky and will stick to the backing. The application of a thermo-adhesive to a backing fabric can also be carried out by a transfer process. In a transfer process, a thermo-adhesive powder is deposited in a dot pattern on a non-adhesive mat, and heated. The fused or melted dots of thermo-adhesive on the non-adhesive mat are then transferred to a backing fabric at a lower temperature. Depositing the thermo-adhesive on a textile substrate by the transfer process makes it possible to avoid excessive penetration of the adhesive into a textile substrate. The resulting thermo-adhesive textile product is then stored at ambient temperature. Preferably the thermo-adhesive textile product will not be tacky or adhesive at ambient temperatures, so that layers of the thermo-adhesive textile product will not adhere to other layers of thermo-adhesive textile product or to other fabrics or materials. Therefore, it is desirable that the resin not become adhesive at too low a temperature, or the product will adhere to other materials at undesired times and locations.

The thermo-adhesive textile product is then used by garment manufacturers who glue the reinforcing material to fabrics by using presses operated at temperatures between 120° C. and 180° C. and at pressures between a few decibars and a few bars for relatively short periods of time (e.g., 10–30 seconds). Under heat and pressure, the polymers and the thermo-adhesive layer (dots) become adhesive. However, if the viscosity of the thermo-adhesive becomes too low, the thermo-adhesive will penetrate completely through the backing fabric or completely through the cloth forming the garment, causing visible marks on the garment cloth or causing undesirable stiffness, which make the product obtained useless. Thus, it is desirable to avoid the use of thermo-adhesive materials which have a viscosity low enough to penetrate completely through either the backing fabric or the garment fabric in order to avoid visible marks on the garment exterior fabric or an undesirable stiffness.

Reinforced fabrics and garments using thermo-adhesive textile products as reinforcing material should also be able to withstand the rigors of normal use and washing; in other words, the bond between the backing fabric and the fabric being reinforced should not break under rigorous ambient conditions caused by use, washing, or dry cleaning.

In order to produce a thermo-adhesive textile product which forms a strong bond capable of withstanding normal use and washing, yet which has sufficient viscosity so as to not penetrate through the backing fabric or the fabric forming the garment, it has been suggested to form the adhesive of two or more layers of polymers with different physical characteristics. By carefully selecting the viscosity and the fusion temperature of these various layers, it is believed possible to limit the excessive penetration of the polymeric adhesive through the backing and/or fabric forming the garment. However, this technique is extremely difficult to perform, and the adhesive remains thermoplastic, so high temperatures during laundering can break the bonds between pieces of fabric.

It has also been suggested to make the resin thermo-setting and thermo-plastic, but it is difficult to control the cross-linking of thermo-setting resins so that the resin will not cross-link before the thermo-plastic material has been heated sufficiently to adhere the thermo-adhesive cross-linkable textile product to another piece of fabric. Further, premature thermo-setting can prevent the thermo-adhesive from being sufficiently thermo-adhesive for application to a cloth or fabric used in a garment.

Therefore, it has been suggested that a thermo-adhesive product should be deposited on a textile substrate, and made thermo-setting by later contact with a cross-linking agent in order to avoid the possibility of thermo-setting the adhesive upon application of the adhesive to the backing or reinforcing material. However, this method does not provide cross-linking throughout the thermo-adhesive material, requires an additional step in garment manufacture, and the addition of cross-linking agent after bonding the reinforcing material to a second piece of fabric is difficult or impossible. Thus, in order to strengthen the bond between the backing or reinforcing textile and the cloth forming the garment by thermo-setting the adhesive, so that, upon heating, the thermo-adhesive does not melt or soften sufficiently to break the bond between the reinforcement and the garment fabric, it was believed necessary to cross-link the adhesive polymer by application of a cross-linking agent in a separate step to the surface of the thermo-adhesive dots.

In U.S. Pat. No. 3,922,418, to Lauchenauer, an interlining material is disclosed having a cross-linking agent in contact only with the surfaces of the resin particles on a supporting fabric; the amount of cross-linking agent in the coating is insufficient to cross-link more than about 40% of the resin. Thus, a weaker bond results between adjoining fabric pieces, and the resin in contact with the supporting fabric which is not cross-linked may soften or melt at elevated temperatures, so that it is easier to break the bond between adjoining fabric pieces.

In U.S. Pat. No. 3,937,859, to Cara et al., a thermo-plastic and thermo-setting resin is formed of a cross-linking agent combined with a terpolymer having the following formula:

where R is selected from the group consisting of ethylene, propylene and butylene, and X is a radical selected from the group consisting of —$CONH_2$ and —COOH. The ratio of a to b is about 1, and c is 1/20 of a and b combined.

The cross-linking agent is a urea formaldehyde, triazine formaldehyde, or melamine resin. The vinyl chloride mer gives off hydrogen chloride gas on heating, which is believed to act as a catalyst in the cross-linking reaction. A fabric, with the terpolymer/cross-linking agent composition thereon, is dried for 20–30 second at about 220° F., which brings the resin to a temperature of about 150° F. (approximately @ 65° C.), at which point the resin softens and becomes adhesive. The fabric is then applied to an outer apparel fabric at a temperature of about 300° F. (148.9° C.). Thus, the adhesive resin used in Cara becomes thermo-adhesive at a relatively low temperature –65° C., but does not become sufficiently cross-linked until a temperature of 150° C. is reached; despite suggesting a temperature range of 250° F. to 350° F., Cara does not teach any compositions or make any suggestions which would enable one to sufficiently cross-link a thermo-adhesive at temperatures below 300° F. (150° C.); this high cross-link temperature required by Cara can damage heat sensitive fabrics. The required vinyl chloride mer of Cara produces HCl gas upon heating, so it can degrade the textile substrate (particularly substrates such as polyester and polyamide), and incomplete cross-linking can cause yellowing of the substrate. Further, it is well known that heating causes polyvinyl chloride to decompose, so it is believed that Cara's terpolymer will break down in high temperature laundering.

Thus, there remains a need for resins which can be stable at ambient temperatures, yet which can become sufficiently cross-linked at lower temperatures than the prior art adhesive formulations used in fabric interlinings. Lower thermo-set temperatures result in energy savings, cause less damage to fabrics which are heat sensitive, and use of resins which become thermo-adhesive at higher temperatures reduces the risk of inadvertent fusing of thermo-adhesive textile products to one another or to other materials prior to use.

Therefore, it is the primary object of the present invention to produce an improved thermo-adhesive cross-linkable textile product and methods for producing and using same in reinforcing other materials.

It is a further object of the present invention to provide an improved thermo-adhesive layer in a thermo-adhesive cross-linkable textile product which becomes tacky or adhesive at temperatures above 80° C. and which cross-links at a temperature (critical temperature) above 100° C., and preferably at about 120° C. to about 130° C.

SUMMARY OF THE INVENTION

These and other objects of the present invention are achieved by a thermo-adhesive textile product comprising a backing fabric and a thermo-adhesive layer deposited on its surface, in which the thermo-adhesive layer is formed of polymers which are cross-linkable (thermo-setting) under the effect of an external influence, such as heat, radiant energy from an ultra-violet source, or other energy source. The polymers remain thermo-plastic as long as they are held below a critical temperature (also called the transformation temperature). Below the critical temperature, the polymers can pass from a pasty or solid state at ambient temperature to a liquid state at a temperature above 80° C., and preferably at about 90° C. In a preferred embodiment, the polymers cross-link at temperatures above 100° C., and preferably between 120° C. and 130° C.

In a preferred method, the thermo-adhesive resin is applied in a dot pattern to a backing fabric, which can be a woven, knitted, non-woven, or another material, by use of a photo-engraving cylinder (it is also possible to apply a continuous layer of the adhesive, but in some instances this may not yield the desired tactile properties in the final product). Preferably, the thermo-adhesive resin is raised to a temperature of about 80° C. prior to being deposited on the backing fabric; at about 80° C., the resin should soften and be tacky enough to adhere well to the backing fabric, while maintaining sufficient viscosity to avoid excessive penetration into the backing fabric. After cooling back to ambient temperature, the thermo-adhesive layer on the backing fabric is not tacky and will not adhere under ambient temperature and pressure conditions to other pieces of fabric which are brought into contact with it. Consequently, the thermo-adhesive textile product is easy to store and transport.

The thermo-adhesive textile product can be used, for example, by manufacturers by gluing the thermo-adhesive textile product to one side of a garment or cloth (it is also contemplated to coat both sides of a backing fabric with adhesive and sandwich the coated textile between other materials). In order to do so, the backing is raised to a temperature of between 120° C. and 130° C. and the thermo-adhesive layer is brought into contact with a garment or cloth. When the temperature rises, two phenomena take place: the first is that the viscosity of the thermo-adhesive layer is reduced due to the thermo-plastic characteristic of the polymeric resin, and the second is that the polymers cross-link at a temperature exceeding the critical temperature. The two phenomena have an opposite effect on the viscosity of the thermo-adhesive layer. Thus, the viscosity first diminishes greatly due to fusion and then increases again as cross-linking occurs.

The reaction speed is determined by the nature of the ingredients, and the possible presence of a cross-linking catalyst. One of skill in the art can modify the amount and type of ingredients to adjust the minimum viscosity of the adhesive layer and the time during which this low viscosity exists. Thus, it is possible to construct a thermo-adhesive layer which allows for good moldability of the substrate onto which the thermo-adhesive product is glued without glue soaking through the cloth of the substrate or its own backing.

Cross-linking of the thermo-adhesive is preferably carried out by an external influence, which can be defined as an increase in temperature, or the effect of radiant energy, such as ultra-violet rays.

Various families of polymers can be used to produce the thermo-adhesive layer according to the invention. For example, the thermo-adhesive layer can comprise in a preferred embodiment a polymer selected from the urethane acrylates; alternate embodiments include ethyl vinyl acetates, and vinyl co-polymers. Preferred resins to do not require a separate cross-linking agent, but are capable of cross-linking with themselves (a catalyst or a photo-initiator may be used). Preferred adhesive layers are more stable at room temperature than the thermo-adhesive layers used in prior art thermo-adhesive textile products and do not melt or become tacky at temperatures below 75° C., preferably below 80° C., yet cross-link at temperatures above 100° C., preferably between about 120° C. and 130° C.

The thermo-adhesive product of the present invention can be applied to various substrates, such as textiles, synthetic, or metallic materials.

DETAILED DESCRIPTION OF THE PREFERRED EMBODIMENTS

Specific compositions and methods for producing thermo-adhesive reinforcing materials are described in more detail in the following non-limiting examples which disclose thermo-adhesive materials that are thermo-plastic at a first elevated temperature range, and thermo-setting at a higher second temperature range. All technical and scientific terms used herein have the same meaning as commonly understood by one of skill in the art. Other methods and materials similar or equivalent to those described herein can be used in the practice or testing of the present invention.

EXAMPLE 1

A preferred embodiment of the present invention is formed from the attachment of a thermo-plastic, thermo-setting, thermo-adhesive layer of urethane acrylate to a suitable backing fabric, such as a knitted fabric, woven, or non-woven fabric. Suitable urethane acrylates for use in the thermo-adhesive layer are aliphatic or aromatic polyurethane oligomers having acrylate ends, and are generally represented as:

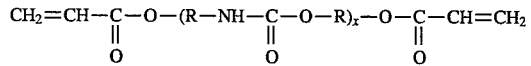

where R is an aliphatic and/or aromatic moiety, x is between 10 and 30, and the molecular weight is between about 1000 and 5000 g/mole. The preferred unsaturation rate generally is between 0.4 and 2 eq/kg. The cross-linking of the multi-acrylate system can be carried out by the action of heat at temperatures ranging from 100° C. to 160° C., preferably from 120° C.–130° C., or by the action of an electron or U.V. beam. Lower temperatures are preferred since higher temperatures may damage the fabric. In a preferred embodiment, an organic peroxide such as, but not limited to, benzoyl peroxide is added as a catalyst when heat is used to induce cross-linking. Note that the preferred urethane acrylate does not require an additional cross-linking agent. In an alternate embodiment, a photoinitiator, such as, but not limited to, benzophenone (diphenylketone), is used when radiant energy such as an electron beam or U.V. beam is used to induce cross-linking.

A non-limiting example of a composition having preferred ranges of ingredients is presented below:

| Ingredient | Parts By Weight |
|---|---|
| Acrylate Polyurethane Oligomer | 40–60 |
| Diluent | 60–40 |
| Peroxide | 2–5 |
| Surface Active Agent | 0.5–1 |
| Phenothiazine | 0–0.1 |
| Thickener | 1–2 |

EXAMPLE 2

An alternate embodiment of the thermo-adhesive layer of the present invention is formed from modified ethyl vinyl acetate, which preferably contains 20% to 40% by weight of an acetate group. These compositions are either partially hydrolyzed to have the general form:

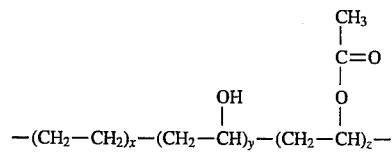

where x is between 600 and 1100, y is between 300 and 400, z is between 300 and 400 and the molecular weight is between about 40,000 and 50,000 g/mole, or completely hydrolyzed to have the general formula:

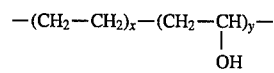

where x is between 600 and 1100 and y is between 300 and 400.

The thermo-adhesive layer may also be formed of a vinyl copolymer such as, but not limited to, vinyl polyacetates of the following general structure:

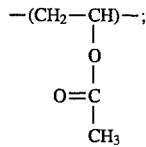

copolymers of vinyl acetate and a vinyl alcohol having the following general structure:

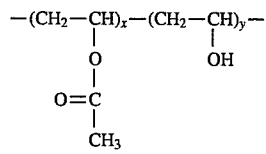

where x is between 250 and 350, y is between 300 and 500, and the molecular weight is between about 35,000 and 52,000 g/mole; copolymers of vinyl acetate and a vinyl chloride (provided the amounts of ingredients are adjusted so that the resulting thermo-adhesive melts or becomes adhesive only at temperatures above 75° C., and thermosets preferably above 80° C. at temperatures over 100° C., preferably between 120° and 130° C.) having the following general structure:

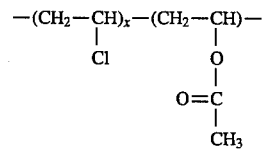

where x is between 400 and 500 and the molecular weight is between about 25,000 and 30,000 g/mole; a polyvinyl butyral having the following general structures:

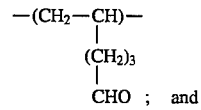

a polyvinyl acetal having the following general structure:

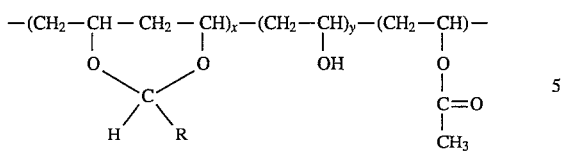

where R=CH$_3$, x is between 200 and 250, y is between 300 and 400, and the molecular weight is between about 36,000 and 46,000 g/mole.

The partially hydrolyzed and completely hydrolyzed ethyl vinyl acetates and vinyl copolymers can be cross linked by the use of various reagents including bi-functional or tri-functional prepolymers; preferred prepolymers include glyoxal, glutaraldehyde, and other dialdehydes, trimethylol melamine, oxalic acid, diepoxides, diisocynates, and dihydroxyaryl sulfones, such as dihydroxydiphenyl sulfone. A further non-limiting example of a thermo-adhesive composition may be formed of the following ingredients:

| Ingredient | Parts By Weight |
|---|---|
| Vinyl copolymer or modified ethyl vinyl acetate | 20–40 |
| Plasticizer | 0–30 |
| Stabilizer | 0–10 |
| Cross-linking agent | 10–20 |
| Thickener | 1–2 |
| Water | 30–60 |

The hydroxyl functionality in the vinyl copolymers or modified ethyl vinyl acetate reacts with cross-linking agents such as melamines, phenolic resins, isocyanates, aldehydes, or urea formol. The cross-linking reaction is highly dependent on the temperature, and cross-linking can occur at temperatures ranging between 100° C. to 160° C. depending on the formulation; it is desired to adjust the cross-link temperature to below 150° C. and preferably to below 130° C., by modifying the forgoing formulations. One of skill in the art can easily modify the reaction compositions to adjust the cross-linking temperature and reaction time. It is possible to increase the cross-linking reaction rate by the addition of catalysts such as a trace of mineral acid or by the presence of an organo-metallic complex of titanium or zirconium.

One of ordinary skill in the art will readily understand and be able to reproduce without undue experimentation the reactions between the preferred cross-linking agents and the hydroxyl functionalities of the vinyl copolymers or modified ethyl vinyl acetates. Generally, the preferred vinyl copolymers or modified ethyl vinyl acetates can be simplified so as to be represented by the following general structure:

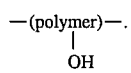

Thus, reaction with a diisocyanate, such as toluene diisocyanate results in a generally cross-linked structure as follows:

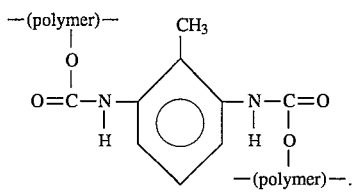

Reaction of the vinyl copolymer or modified ethyl vinyl acetates with a phenolic cross-linking agent results in a thermo-adhesive having the following general structure:

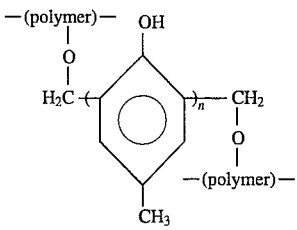

where n is 1, 2, or 3 and the molecular weight is about 40,000 g/mole. The polymer that results when a phenolic cross-linking agent is used will still have hydroxyl functionalities that are available for further cross-linking to produce a reticulated product.

A further non-limiting example involves the cross-linking of the preferred vinyl copolymers or modified ethyl vinyl acetates of the present invention with melamine resins to form a cross-linked product having the following general structure:

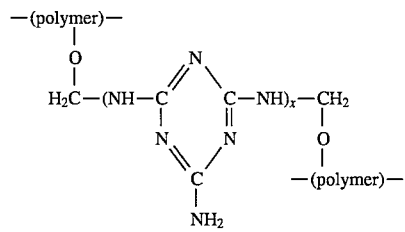

where x is 1, 2, or 3 and the molecular weight is about 40,000 g/mole. The thermo-plastic, thermo-setting, thermo-adhesives of the present invention are preferably applied with a photoengraving cylinder to a suitable backing material in a dot pattern. It is preferred that the thermo-adhesive material of the present invention first be applied in the form of dots to a heated carrier so that it becomes thermo-plastic with a substantially reduced viscosity; the heated liquid or semi-liquid thermo-adhesive dots are then transferred to a cool or ambient temperature backing fabric. After cooling, the thermo-adhesive on the new thermo-adhesive product will resolidify and loose its tackiness or adhesiveness. The weight of resin on the backing will vary depending on the desired tactile qualities, and can be adjusted in a similar manner to conventional thermo-plastic adhesive coatings. Upon reheating to a first temperature range, which is sufficient to lower the viscosity of the thermo-plastic dots, but which is below the thermo-set temperature, the viscosity of the thermo-plastic adhesive dots will be reduced sufficiently to allow for the individual dots to become adhesive and to have a viscosity that is sufficiently low to allow the intimate intermeshing of the thermo-adhesive composition with the surface of the substrate to which the backing is to be attached. Upon further heating above the first temperature range to a second temperature range that exceeds the thermo-set temperature or critical temperature, the dots of the thermo-adhesive material resolidify; the thermo-setting process causes the thermo-adhesive dots to resolidify, and firmly binds the backing material to the substrate.

From the above teachings, it is apparent that many modifications and variations of the present invention are possible. It is therefore to be understood that, within the scope of the appended claims, the invention may be practiced otherwise then as specifically described.

I claim:

1. A fusible interlining comprising a backing fabric and a thermo-adhesive layer deposited in discontinuous fashion on one side of said backing fabric, wherein said thermo-adhesive layer consists essentially of:

a polymer base that is thermo-plastic at a first temperature range and thermo-setting at a second temperature range, said first temperature range being beneath the critical temperature at which said polymer base becomes thermo-setting, and said second temperature range being above the temperature at which said polymer base becomes thermo-setting, so that said thermo-adhesive layer is cross-linkable by application of heat alone without requiring a separate cross-linking agent; and said adhesive layer is a polymer selected from the group consisting of urethane acrylate.

2. A fusible interlining according to claim 1, wherein: said thermo-adhesive layer comprises a urethane acrylate having the following general structure:

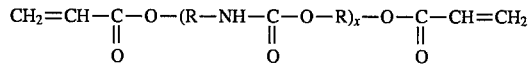

wherein "R" is aliphatic or aromatic and x is between 10 and 30.

3. The fusible interlining of claim 2, wherein: said urethane acrylate has a degree of unsaturation between 0.4 and 2 eq/kg, and further comprising a reagent selected from the group consisting of organic peroxides and photoinitiators; wherein, when said reagent is said organic peroxide, subjecting said urethane acrylate to a temperature between 100° C. to 160° C. causes cross-linking; and wherein, when said reagent is a photoinitiator, subjecting said urethane acrylate to a radiation source selected from the group consisting of electron beam and U.V. causes cross-linking.

4. The fusible interlining of claim 3, wherein: said organic peroxide is benzoyl peroxide and said photoinitiator is benzophenone.

5. The fusible interlining of claim 2, wherein: said thermo-adhesive layer comprises:

| Ingredient | Parts By Weight |
|---|---|
| Acrylate Polyurethane | 40–60 |
| Oligomer | 40–60 |
| Peroxide | 2–5. |

6. The fusible interlining of claim 5, further comprising:

| Ingredient | Parts By Weight |
|---|---|
| Diluent | 60–40 |
| Surface Active Agent | 0.5–1 |
| Phenothiozine | 0–0.1 |
| Thickness | 1–2. |

* * * * *